United States Patent
Watson et al.

(10) Patent No.: US 7,817,788 B2
(45) Date of Patent: Oct. 19, 2010

(54) CONTENT DISTRIBUTION SYSTEM AND METHOD

(75) Inventors: John Xavier Watson, Coral Gables, FL (US); Jay Herratti, New York, NY (US)

(73) Assignee: HSN Interactive LLC, St. Petersburg, FL (US)

( * ) Notice: Subject to any disclaimer, the term of this patent is extended or adjusted under 35 U.S.C. 154(b) by 1344 days.

(21) Appl. No.: 11/300,706

(22) Filed: Dec. 13, 2005

(65) Prior Publication Data

US 2007/0136739 A1 Jun. 14, 2007

(51) Int. Cl.
*H04M 11/00* (2006.01)

(52) U.S. Cl. .............. 379/91.01; 379/90.01; 379/93.05; 725/4

(58) Field of Classification Search .............. 379/91.01, 379/90.01, 93.05, 93.13, 93.17; 463/17, 463/25, 40; 725/4–7, 13, 24, 56–104
See application file for complete search history.

(56) References Cited

U.S. PATENT DOCUMENTS

| 6,389,055 B1 * | 5/2002 | August et al. ................ 375/130 |
| 2003/0003990 A1 * | 1/2003 | Von Kohorn .................. 463/25 |
| 2005/0169456 A1 * | 8/2005 | Smith et al. ............ 379/265.09 |

* cited by examiner

*Primary Examiner*—Melur Ramakrishnaiah
(74) *Attorney, Agent, or Firm*—Stephen M. De Klerk; Sonnenschein, Nath & Rosenthal LLP

(57) ABSTRACT

A content distribution system is described. The content distribution system includes a show account database and a plurality of credit cards stored in the show account database. The content distribution system also has a linking module associating a viewer entering the call-in number with a credit card number in the show account database. The system has a charge module that charges a credit card account corresponding to the credit card number associated with a viewer entering the call-in number. The system also has an interactive recognition system that provides a qualifying question for the viewer to answer before a call of the viewer is connected to a studio.

11 Claims, 4 Drawing Sheets

SHOW ACCOUNT DATABASE 54

| CALLER ID NUMBER | CREDIT CARD NUMBER | EXPIRATION DATE | 4-DIGIT PIN NUMBER |
|---|---|---|---|
| 480 321 7285 | 5217 8321 3215 6219 | 06/07 | 4213 |
| 310 217 5218 | 4167 3218 2217 6718 | 09/09 | 1571 |
| 650 239 5216 | 4281 6718 6219 4217 | 07/09 | 2157 |
| 408 341 2621 | 6718 4281 6128 4281 | 06/05 | 8321 |
| 501 216 2121 | 6219 6718 4281 6718 | 05/03 | 5215 |
| 510 832 5261 | 2523 8821 6219 4217 | 12/06 | 2162 |
| 238 521 8012 | 2153 6219 8831 6310 | 11/09 | 8215 |
| 201 512 8071 | 5218 8217 8831 5218 | 10/08 | 2152 |
|  |  |  |  |

FIG. 2

AGGREGATION MODULE 58

| CREDIT CARD NUMBER | DATE | AMOUNT |
|---|---|---|
| 4167 3218 2217 6718 | AUG 22, 2005 | 0.99 |
| | SEPT 2, 2005 | 0.99 |
| | SEPT 7, 2005 | 0.99 |
| 6718 4281 6128 4281 | AUG 15, 2005 | 0.99 |
| | AUG 23, 2005 | 0.99 |
| | | |
| | | |
| | | |

FIG. 3

CONTENT DISTRIBUTION SYSTEM AND METHOD

BACKGROUND OF THE INVENTION

1. Field of the Invention

This invention relates to a content distribution system and method.

2. Discussion of Related Art

Television (TV) content, as is commonly known, is provided over cable networks or the airwaves as radio frequency waves to TV sets in the homes of viewers. Viewers are sometimes allowed to interact with a presenter. In a quiz show, a presenter may ask a series of live questions, and invite viewers to call a call-in number and answer a question. A content provider may wish to obtain revenue from viewers who venture to provide an answer. Telephone networks in most countries provide for numbers to be called where an account of the person making the call is charged, and the revenue be applied to an account of the person receiving the call. In the United States, these numbers are typically 1-900 numbers. 1-900 numbers have obtained a reputation as being related to morally questionable activities, and many viewers will refrain from calling such a number.

SUMMARY OF THE INVENTION

The invention provides a content distribution system that includes a studio set having an area for a presenter to be located, at least one camera positionable to capture a scene at the area where the presenter is to be located, a transmission system connected to the camera, the transmission system having hardware required to transmit the scene captured by the camera to a plurality of remote locations, to be viewed by viewers on screens located at the remote locations, and having the capability to transmit a call-in number to the plurality of remote locations, a call-receiving system, connected to at least one telephone network, to receive a call from at least one of the viewers entering the call-in number, and a speaker, at least in proximity to the studio set, connected to the call-receiving system, to allow the call to go through to the presenter at the studio set.

The distribution system may have a show account database, a plurality of credit card numbers stored in the show account database, a linking module associating the viewer entering the call-in number with a credit card number in the show account database, and a charge module that charges a credit card account corresponding to the credit card number associated with the viewer entering the call-in number.

The transmission system may be a TV broadcast system.

The content distribution system may further include an interactive recognition system connected to the call-receiving system.

The interactive recognition system may include a new account-creating module that prompts the viewer to enter a credit card number, receives the credit card number, and stores the credit card number in the show account database.

The content distribution system may further include a caller identification system that identifies the viewer as having previously stored a credit card number in the show account database, or not having previously stored a credit card number in the show account database, the interactive recognition system only prompting the viewer to enter the credit card number if the credit card number is not present in the show account database.

The interactive recognition system may prompt the viewer to enter a PIN number if the credit card number is in the show account database.

The credit card account is preferably not charged until after the viewer enters the PIN number.

The content distribution system may further include an aggregation module, multiple charges to the credit card account being charged on a day that is delayed from a day that the viewer enters the call-in number.

The content distribution system may further include a selection module that selects one of multiple viewers dialing the call-in number, only the call of the one viewer who is selected being transferred through to the studio set.

The interactive recognition system may include a preselection module that provides a qualifying question to a viewer, receives a qualifying guess from the viewer, compares the qualifying guess to a question model answer, and either progresses the call to the studio set or ends the call based on said comparison of the qualifying guess with a question model answer.

The invention also provides a method of distributing content, which includes capturing a scene including a presenter on a studio set, utilizing at least one camera, transmitting the scene from the camera to a plurality of remote locations, to be viewed on screens located at the remote locations, transmitting a call-in number to the plurality of remote locations, receiving a call from at least one of the viewers entering the call-in number over at least one telephone network, linking the viewer entering the call-in number with a credit card number in a show account database, charging a credit card account corresponding to the credit card number with the viewer entering the call-in number, and putting the call through to a speaker to be heard by the presenter.

BRIEF DESCRIPTION OF THE DRAWINGS

The invention is further described by way of example with reference to the accompanying drawings, wherein:

FIG. 2 is a table illustrating fields in a show account database of the system;

FIG. 3 is a table illustrating fields in an aggregation module of the system.

DETAILED DESCRIPTION OF THE INVENTION

Figure 1:
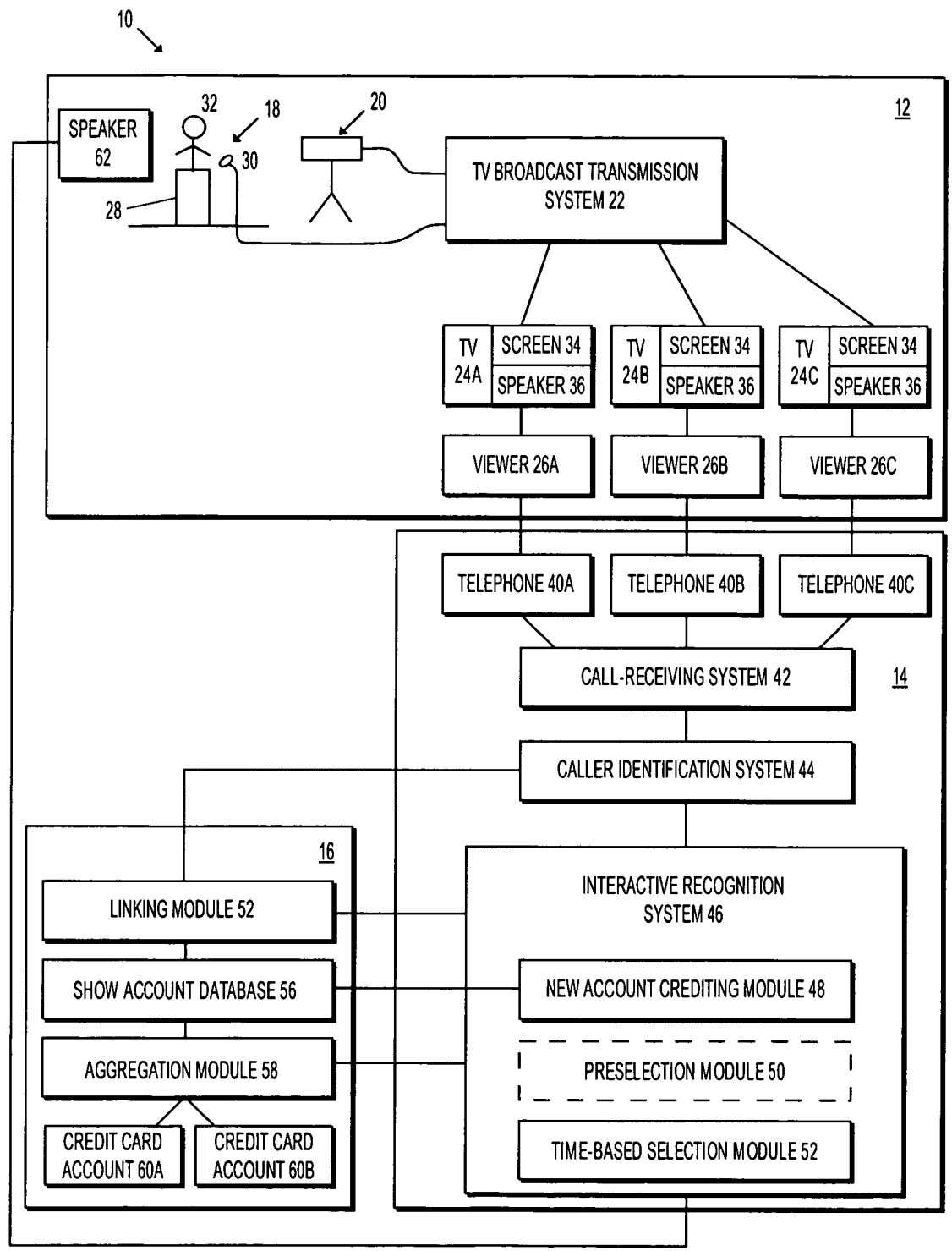
FIG. 1 is a block diagram of a content distribution system, according to an embodiment of the invention.
Figure 4:
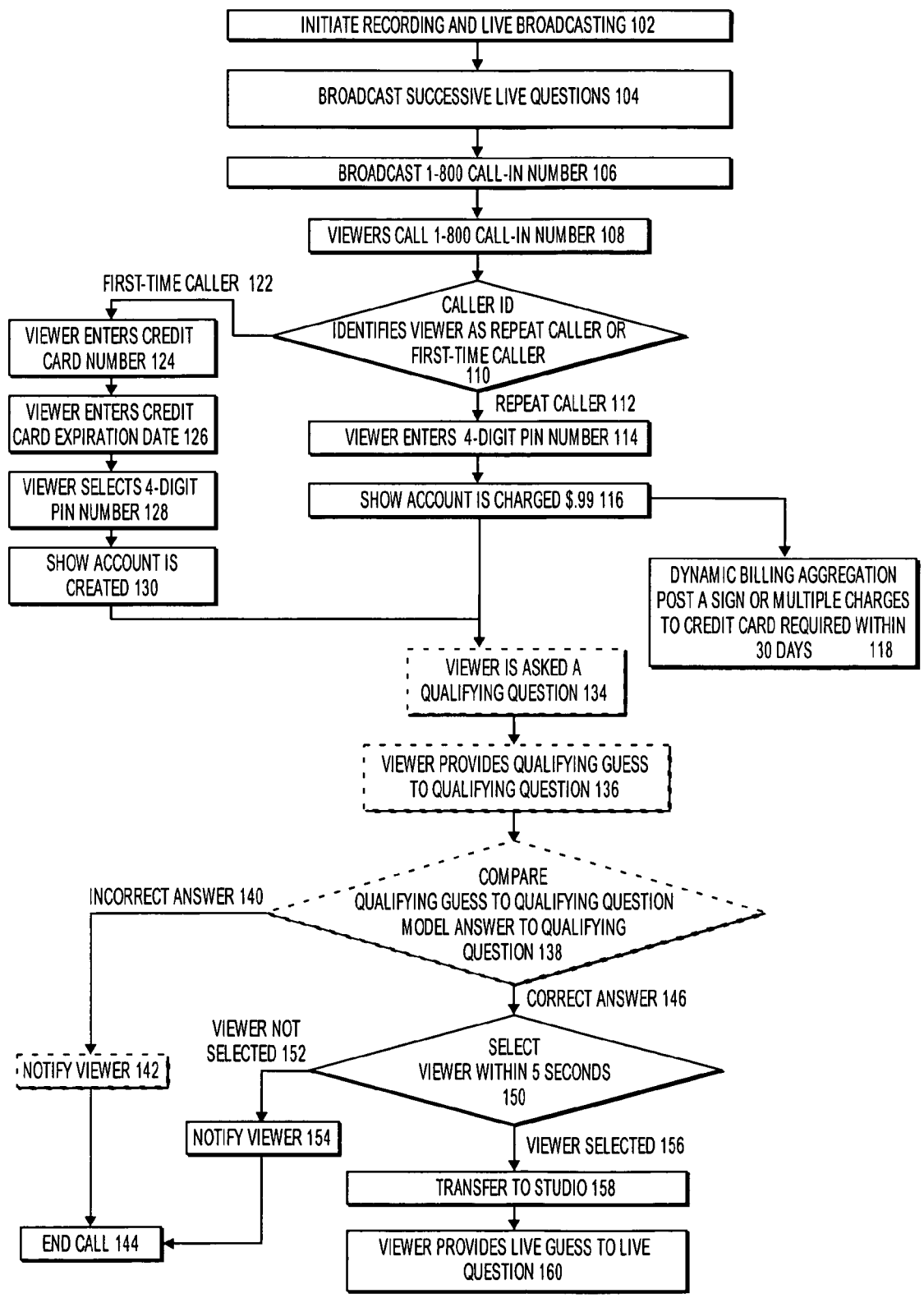
FIG. 4 is a flow chart illustrating how the system works.

FIG. 1 of the accompanying drawings illustrates a content distribution system 10, according to an embodiment of the invention, including a show recording and broadcasting system 12, a call management system 14, and an account management system 16.

The show recording and broadcasting system 12 includes a studio set 18, a TV camera 20, a TV broadcast transmission system 22, a plurality of TVs 24A, 24B, and 24C, and a plurality of viewers 26A, 26B, and 26C.

The studio set 18 has a podium area 28 and a microphone 30. A presenter 32 can be positioned on the podium area 28. The microphone 30 is sufficiently close to the presenter 32 to pick up speech from the presenter 32.

The TV camera 20 is located just outside the studio set. The TV camera 20 can capture a live picture and is positionable to capture a scene that includes the presenter 32 at the podium area 28.

The TV camera 20 and the microphone 30 are both connected to the TV broadcast transmission system 22. The TV broadcast transmission system 22 includes hardware and software that transmits a signal of the image captured by the TV camera 20 and sound from the microphone 30 to the TV's 24A, 24B, and 24C. Signals may, for example, be transmitted over a cable network or over the airwaves. Although TV broadcasting is described, it is also envisioned that the invention may find application in other forms of signal transmission, for example over the Internet, to a plurality of computer systems.

Each TV 24A, 24B, and 24C has a screen 34 and a speaker 36. The image captured by the TV camera 20 is displayed in real time on the screens 34, and a sound signal picked up by the microphone 30 creates sound in real time out of the speakers 36. The viewers 26A, 26B, and 26C in front of the TVs 24A, 24B, and 24C can see the presenter 32 on the screens 34 and hear the presenter 32 through the speakers 36 in real time.

The call management system 14 includes a plurality of telephones 40A, 40B, and 40C, a call-receiving system 42, a caller identification system 44, and an interactive recognition system 46.

Each one of the telephones 40A, 40B, and 40C is located in the home of a respective one of the viewers 26A, 26B, and 26C. The telephones 40A, 40B, and 40C are connected over at least one telephone network to the call-receiving system 42. The telephones 40A, 40B, and 40C may, for example, be conventional land-line telephones or cellular telephones, and may be connected through one or more land-line networks or one or more cellular networks to the call-receiving system 42.

The caller identification system 44 is connected to the call-receiving system 42. A caller identification system can recognize a telephone number of a telephone from which it is receiving a call. Caller identification systems are known in the art, and are not described herein in detail.

The interactive recognition system 46 is connected to the caller identification system 44. The interactive recognition system 46 is a computer system that can interact with a caller and progress a caller through a menu. The caller may use a dial pad of a telephone to interact with the interactive recognition system 46, and/or the interactive recognition system 46 may be programmed to recognize voice commands. The interactive recognition system 46 includes a new-account creating module 48. A future embodiment of the interactive recognition system 46 may also include a preselection module 50. The interactive recognition system 46 also includes a time-based selection module 52

The account management system 16 includes a show account database 54, a linking module 56, an aggregation module 58, and a plurality of credit card accounts 60A and 60B.

FIG. 2 illustrates the contents of the show account database 54 in more detail. The show account database 54 has fields for caller ID number; credit card number; expiration date; and four-digit PIN number. Each respective caller ID number has one credit card number, expiration date, and four-digit PIN number associated therewith.

Referring again to FIG. 1, the linking module 56 is connected between the caller identification system 44 and the show account database 54. The linking module 56 can perform a look-up operation of a respective caller ID number corresponding to a caller ID number detected by the caller identification system 44. The linking module 56 is used to determine whether a respective account exists in the show account database corresponding to the caller ID number detected by the caller identification system 44. The linking module 56, after performing the look-up, can extract the credit card number, expiration date, and four-digit PIN number corresponding to a respective caller ID number in the show account database 54. The interactive recognition system 46 is connected to the linking module 56, so that the interactive recognition system 46 can determine the validity of a four-digit PIN entered by a viewer and an expiration date of a credit card housed in the show account database 54.

The aggregation module 58 is connected to the show account database 54 and to the interactive recognition system 46. FIG. 3 illustrates show accounts in the aggregation module 58. The aggregation module 58 includes fields for credit card number, date, and amount. The aggregation module 58 is used to extract a credit card number from the show account database, aggregate charges against the respective credit card number, and periodically (e.g., every 30 days) charge a respective credit card account 60A or 60B with all the charges against the credit card number. The credit card accounts 60A and 60B may be credit card accounts such as VISA® or MasterCard® accounts located off-site.

The studio set 18 further has a speaker 62 connected to the interactive recognition system 46. The interactive recognition system 46 can transfer a call received thereby through to the speaker 62. The speaker 62 is in proximity to the presenter 32. The presenter 32 can listen to the call while an image and voice of the presenter 32 is being broadcast.

Reference is now made to FIGS. 1 and 3 in combination. In use, recording and live broadcasting is initiated (102). The camera 20 is positioned so as to capture a scene that includes the presenter 32 at the podium area 28, and speech from the presenter 32 is picked up and converted to a voice signal by the microphone 30. Image and voice signals are transmitted by the TV broadcast transmission system 22 to the TVs 24A, 24B, and 24C, and the viewers 26A, 26B, and 26C view the presenter 32 on the screens 34 and can hear the presenter through the speakers 36 in real time.

Successive live questions are then broadcast (104). The presenter 32 typically has a stack of cards, each containing a respective question. The presenter 32 reads the question from one card, and a sound signal of the question is transmitted to the viewers 26A, 26B, and 26C.

A 1-800 call-in number is then broadcast (106). The 1-800 call-in number is typically spoken by the presenter 32, to be heard by the viewers 26A, 26B, and 26C. The TV broadcast transmission system 22 also causes the display of the 1-800 call-in number on the screens 34 to be viewed by the viewers 26A, 26B, and 26C. The presenter 32 then prompts the viewers 26A, 26B, and 26C to call the 1-800 call-in number to submit an answer to the question for purposes of potentially winning a prize. 1-800 call-in numbers are widely accepted and by themselves are free of charge in the United States.

Some of the viewers (e.g., viewer 26C) subsequently call the 1-800 call-in number (108) using the respective telephones 40A, 40B, and 40C. The call-receiving system 42 receives the calls. The caller identification system 44 identifies each caller as either a repeat caller or a first-time caller (110). The caller identification system 44 extracts a caller ID number from data that is transmitted together with the call. The linking module 56 determines whether the caller ID number extracted from the call is listed as one of the caller ID numbers in the show account database 54 shown in FIG. 2. If the viewer 26C is a repeat caller (112), the call is transferred to the interactive recognition system 46. The interactive recognition system 46 then prompts the viewer 26C to enter a four-digit PIN number, and the viewer 26C subsequently enters a four-digit PIN number (114). The interactive recognition system 46 then compares the four-digit PIN number entered by the viewer 26C with the four-digit PIN number corresponding to the caller ID number of the respective viewer 26C in the show account database 54.

If the four-digit PIN number entered by the viewer 26C is the same as the four-digit PIN number in the show account database 54, a show account in the aggregation module 58 is charged $0.99. The show account includes fields for the credit card number that is charged, and all charges that have been made against the respective credit card number (116). All charges recorded in the aggregation module 58 are posted against respective credit card accounts 60A and 60B on a periodic basis, for example within every 30 days (118).

If the viewer 26C is a first-time caller (122), the interactive recognition system 46 prompts the viewer 26C to enter a credit card number, and the viewer 26C enters a credit card number (124). The interactive recognition system 46 then prompts the viewer 26C to enter a credit card expiration date, and the viewer 26C enters a credit card expiration date (126). The interactive recognition system 46 then prompts the viewer 26C to enter a four-digit PIN number, and the viewer enters a four-digit PIN number (128). The interactive recognition system 46 then creates a new show account in the show account database 54 (130). The new show account has a caller ID number corresponding to the caller ID number identified by the caller identification system 44, and the credit card number, expiration date, and four-digit PIN number entered by the viewer.

In the case where the viewer is a first-time caller (122), the call then progresses in the same manner as when the viewer 26C is a repeat caller (112), except that the show account of the first-time caller 122 is not charged. A viewer who is a first-time caller is thus allowed to make one free call.

In a second generation of the system 10, the interactive recognition system 46 subsequently asks the viewer a qualifying question (134). The interactive recognition system 46 may be one system or separate systems. In the case of separate systems, the first system may handle credit card information, and the second system, the qualifying question. The viewer then provides a qualifying guess to the qualifying question (136). The qualifying guess may, for example, be entered on a dial pad of the telephone 40A, 40B, or 40C, or the interactive recognition system 46 may be programmed to recognize a spoken qualifying guess from the viewer. The interactive recognition system 46 then compares the qualifying guess to a qualifying question model answer to the qualifying question (138). In the case where the qualifying guess is not the same as the qualifying question model answer to the qualifying question, i.e., in the case of an incorrect answer (140), the interactive recognition system 46 notifies the viewer 26C that the qualifying guess is incorrect (142). The interactive recognition system 46 then ends the call (144).

In the case where the qualifying guess is the same as the qualifying question model answer to the qualifying question, i.e., when the viewer has provided a correct answer (146), the interactive recognition system 46 connects the call of the viewer 26C to the time-based selection module 52. The time-based selection module 52 also has lines connected from other viewers (e.g., viewer 26B) who have progressed as far as the viewer 26C in question. In a first generation of the system 10, no preselection module 50 will be provided; calls are transferred directly after a show account is charged in 166 or a show account is created in 130 to the time-based selection module. The time-based selection module drops a call if the call has been connected thereto for five seconds (150). If a viewer, e.g., viewer 26C, is not selected (152), the time-based selection module notifies the viewer 26C and ends the call (154; 144).

If a viewer, e.g., viewer 26B, is selected within five seconds (156), the call of the viewer 26B is transferred to the studio set 18 (158). The call of the selected viewer 26B is played by the speaker 62 to allow the presenter 32 to interact with the viewer 26B. The viewer 26B is then given the opportunity to provide a live guess to the live question provided by the presenter 32 in 104 (160). The presenter 32 then compares the live guess to a model answer on the card in front of the presenter 32. If the live guess is the same as the answer on the card, the presenter 32 notifies the viewer 26B that the answer is correct and that the viewer 26B is eligible for a prize. By contrast, if the live guess is incorrect, the presenter 32 so notifies the viewer 26B.

The viewer in the example of FIG. 3 creates a show account database by making a call. It may also be possible that the viewer may create a show account database in another manner. For example, the viewer may create a show account database by mailing an entry form. The viewer may alternatively create a show account database over the Internet. An Internet-based system will have a form that can be viewed on a browser and that can be filled out and be submitted by the viewer.

A viewer may also make use of an alternate means of entry than the first-time caller/repeat caller system of FIG. 3. In an alternate means of entry, the viewer may submit a postcard to an address that is provided, and receive a PIN number, for example, a five-digit PIN number, in return. The viewer can then call the 1-800 number as in 108, and enter the five-digit PIN number when prompted. The viewer's call will then be connected as if the show account is charged in 116, but without charging the viewer. Further handling of the call will be the same as described in FIG. 3.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A content distribution system, comprising:
a studio set having an area for a presenter to be located;
at least one camera positionable to capture a scene at the area where the presenter is to be located;
a transmission system connected to the camera, the transmission system having hardware required to transmit the scene captured by the camera to a plurality of remote locations, to be viewed by viewers on screens located at the remote locations, and having the capability to transmit a call-in number to the plurality of remote locations;
a show account database;
a plurality of credit card numbers stored in the show account database;
a call-receiving system, connected to at least one telephone network, to receive a call from at least one of the viewers entering the call-in number;
a linking module associating the viewer entering the call-in number with a credit card number in the show account database;
a charge module that charges a credit card account corresponding to the credit card number associated with the viewer entering the call-in number; and
a speaker, at least in proximity to the studio set, connected to the call-receiving system, to allow the call to go through to the presenter at the studio set.

2. The content distribution system of claim 1, wherein the transmission system is a TV broadcast system.

3. The content distribution system of claim 1, further comprising an interactive recognition system connected to the call-receiving system.

4. The content distribution system of claim 3, wherein the interactive recognition system includes a new account-creating module that:
   prompts the viewer to enter a credit card number;
   receives the credit card number; and
   stores the credit card number in the show account database.

5. The content distribution system of claim 4, further comprising a call identification system that identifies the viewer as having previously stored a credit card number in the show account database or not having previously stored a credit card number in the show account database, the interactive recognition system only prompting the viewer to enter the credit card number if the credit card number is not present in the show account database.

6. The content distribution system of claim 5, wherein the interactive recognition system prompts the viewer to enter a pin number if the credit card number is in the show account database.

7. The content distribution system of claim 6, wherein the credit card account is not charged until after the viewer enters the pin number.

8. The content distribution system of claim 1, further comprising an aggregation module, multiple charges to the credit card account being charged on a day that is delayed from a day that the viewer enters the call-in number.

9. The content distribution system of claim 1, further comprising a selection module that selects one of multiple viewers dialing the call-in number, only the call of the one viewer who is selected being transferred through to the show recording studio.

10. The content distribution system of claim 3, wherein the interactive recognition system includes a preselection module that:
    provides a qualifying question to the viewer;
    receives a qualifying guess from the viewer;
    compares the qualifying guess to a question model answer; and
    either progresses the call to the studio set or ends the call based on said comparison of the qualifying guess with the question model answer.

11. A content distribution system, comprising:
    a studio set having an area for a presenter to be located;
    at least one camera positionable to capture a scene at the area where the presenter is to be located;
    a transmission system connected to the camera, the transmission system having hardware required to transmit the scene captured by the camera to a plurality of remote locations, to be viewed by viewers on screens located at the remote locations, and having the capability to transmit a call-in number to the plurality of remote locations;
    a call-receiving system, connected to at least one telephone network, to receive a call from at least one of the viewers calling the call-in number;
    an interactive recognition system that includes a preselection module that provides a qualifying question to the viewer, receives a qualifying guess from the viewer, compares the qualifying guess to a question model answer, and either progresses the call to the studio set or ends the call based on said comparison of the qualifying guess with the question model answer; and
    a speaker, at least in proximity to the studio set, connected to the interactive recognition system, to allow the call to go through to the presenter at the studio set.

\* \* \* \* \*